United States Patent Office 2,952,467
Patented Sept. 13, 1960

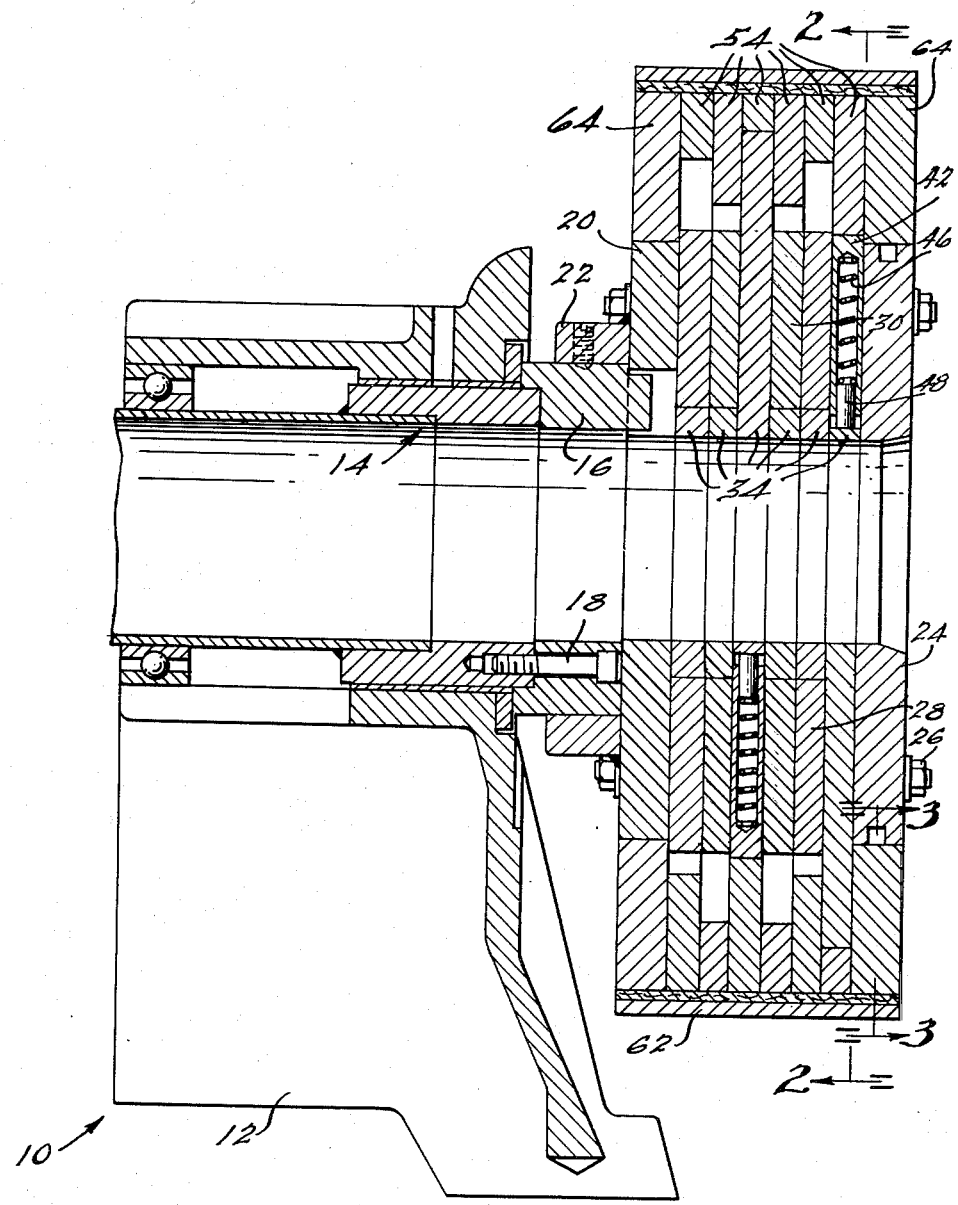

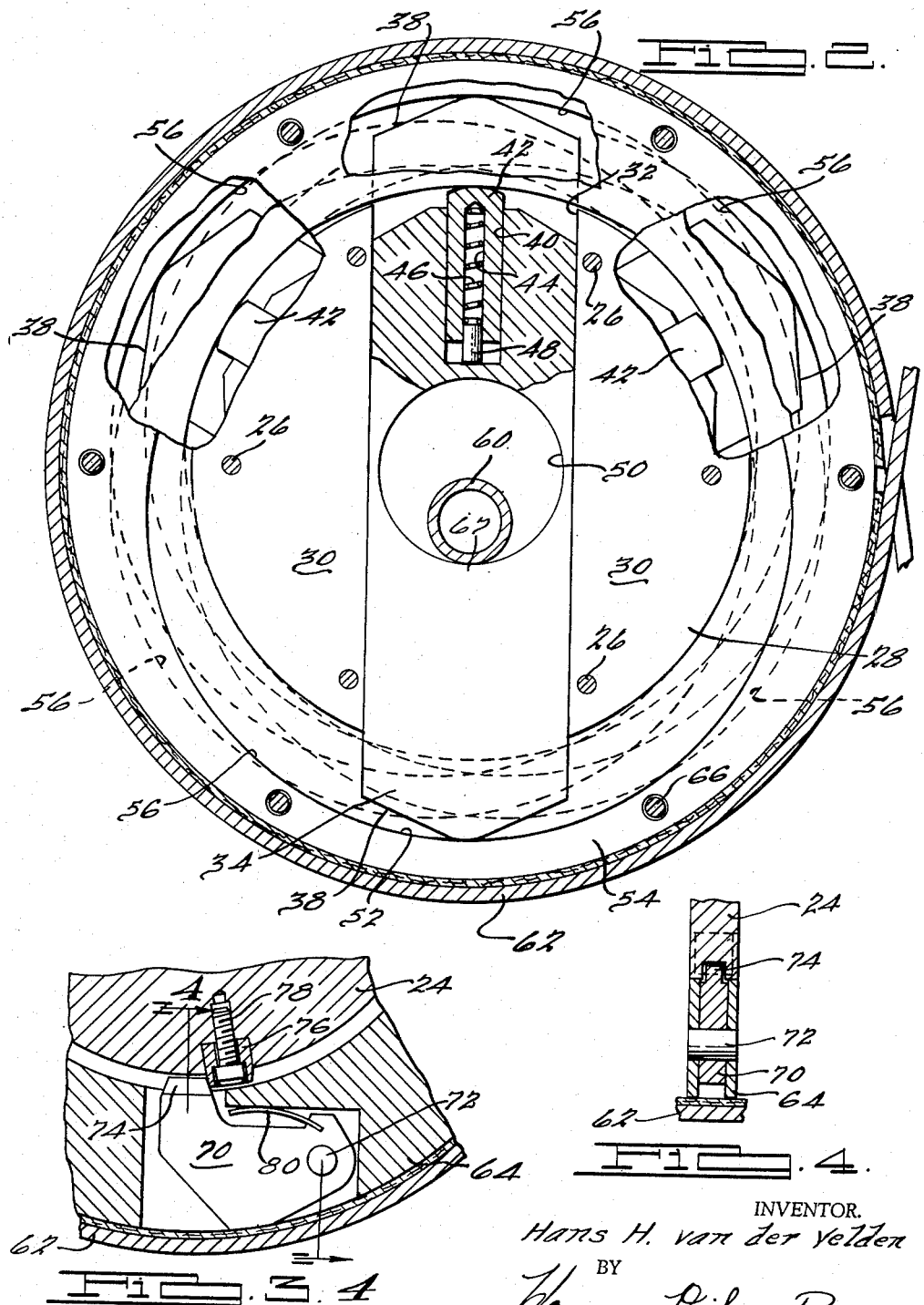

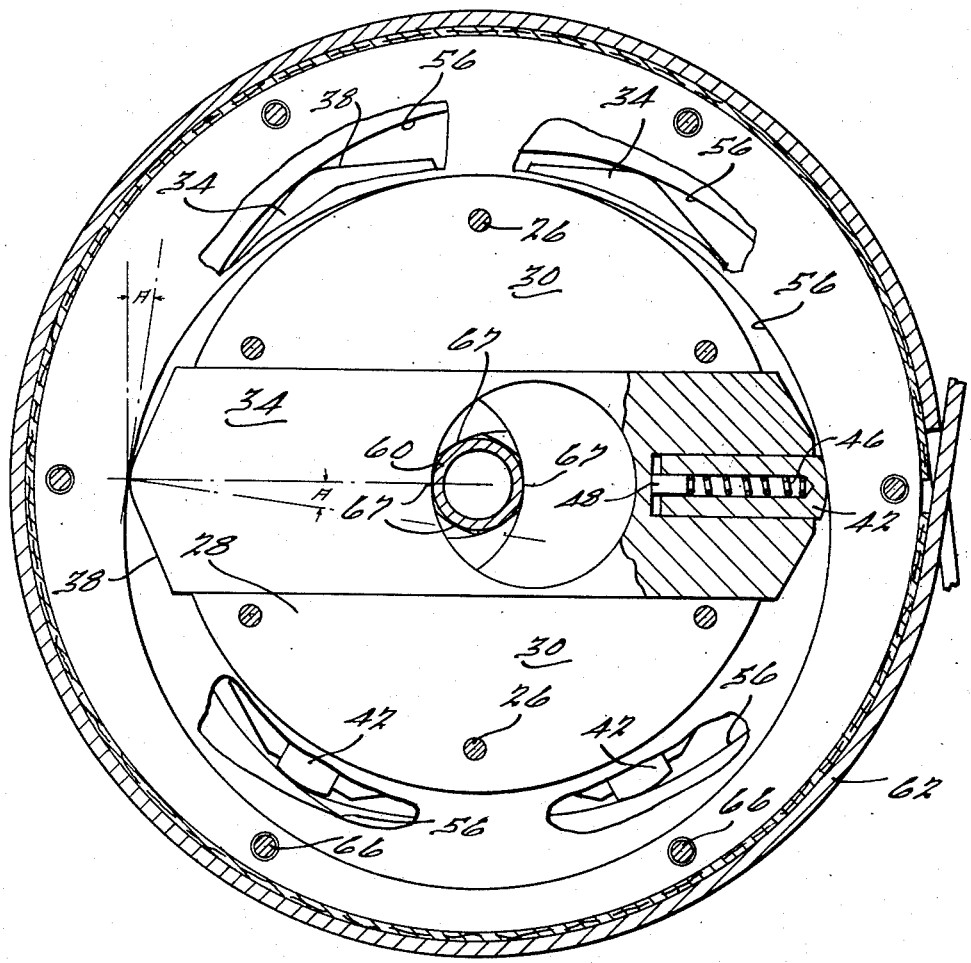

2,952,467
CHUCK

Hans H. van der Velden, Toledo, Ohio, assignor to The Toledo Pipe Threading Machine Co., Toledo, Ohio, a corporation of Ohio Filed Dec. 19, 1958, Ser. No. 781,689
6 Claims. (Cl. 279—6)

This invention relates generally to chucks and more particularly to a chuck in which the workpiece clamping jaws also function to center the workpiece in the chuck.

An object of this invention, therefore, is to provide an improved chuck.

A further object of this invention is to provide an improved chuck which utilizes the driving mechanism that rotates the workpiece for also opening and closing the chuck jaws.

Still another object of this invention is to provide a chuck which is simple in construction, economical to manufacture, and efficient in operation in gripping and driving a workpiece in a centered position on the chuck.

Further objects, features and advantages of this invention will become apparent from a consideration of the following description, the appended claims and the accompanying drawing in which:

Figure 1 is a fragmentary vertical sectional view of the chuck of this invention;

Fig. 2 is a transverse sectional view looking substantially along the line 2—2 in Fig. 1, and showing the chuck jaws in open positions;

Fig. 3 is a fragmentary sectional view as seen along the line 3—3 in Fig. 1;

Fig. 4 is a fragmentary sectional view looking substantially along the line 4—4 in Fig. 3; and Fig. 5 is a transverse sectional view illustrated similarly to Fig. 2 and showing the chuck jaws in closed positions on a tubular workpiece.

With reference to the drawing, the chuck of this invention, indicated generally at 10, is illustrated in Fig. 1 as including a suitable support frame or base 12 which rotatably supports a hollow spindle assembly 14 that is driven by any suitable mechanism (not shown). A chuck mounting ring 16 is secured by cap screws 18 to the outer end of the spindle assembly 14 as shown in Fig. 1. An inner cover plate 20, of ring-shape, is provided with an inwardly directed flange 22 which is secured to and extends about the mounting ring 16 to provide for rotation of the cover plate 20 with the ring 16. An outer cover plate 24, likewise of ring-shape, is positioned in a coaxial relation with the inner cover plate 20 and is spaced therefrom. A plurality of bolts 26 connect the cover plate 24 to the cover plate 20.

A plurality of guide plate units 28, illustrated as six in number, are disposed between and arranged in a coaxial relation with the cover plates 20 and 24. As shown in Fig. 2, each guide plate unit 28 is formed in two half sections 30 arranged in a co-planar facing relation so that they define a slot 32 therebetween which extends diametrically across the plate unit 28. An elongated jaw member 34, of a width to be slidably supported within the slot or guideway 32, is provided for each of the guide plate units 28.

Each jaw member 34 is formed at one end with a curved surface 38 and at the opposite end with a longitudinally extending slot 40. A jaw extension member 42 is slidably disposed within the slot 40 and has a longitudinally extending opening 44 in which a spring 46 is arranged. The spring 46 is supported on a pin 48 carried by the jaw and projected into the opening 44 in the extension member 42. The spring 46 thus normally urges the extension member 42 outwardly of the jaw 34 so as to extend the jaw in a direction lengthwise thereof. Intermediate its ends, each jaw 34 is formed with a circular opening 50 which, in the opened positions of the jaws 34 illustrated in Fig. 2, is aligned with the axis of the spindle assembly 14.

Each jaw 34 is of a length to extend outwardly of opposite ends of its guide slot 32 so that one end of the jaw is engageable with the inner surface 52 of a cam ring member 54 which extends about each jaw member 34. As shown in Fig. 2, a ring member 54 has its inner surface 52 defined by an opening 56, which is eccentric with respect to the spindle assembly 14. Consequently, in response to relative rotation of a jaw member 34 and its ring member 54, the jaw member 34 is moved longitudinally of the slot 32 so as to shift the jaw opening 50 with respect to the axis of the spindle assembly 14.

The six ring members 54, corresponding to the six jaw members 34, are connected by bolts 66 to each other and to a pair of annular supporting plates 64 that are rotatably supported on the cover plates 20 and 24 by bolts 66. As best appears in Figs. 2 and 5, the ring member openings 56 are positioned out of alignment so that the six illustrated jaw members 34 are shifted in six different directions in response to rotation of the jaw members 34 relative to the ring members 54. The jaw members 34 are spaced equal angular distances apart so that the six different directions referred to are likewise equally spaced.

In the operation of the chuck 10, the actuating rings 54 and the jaw members 34 are initially manipulated relative to each other so that the jaw openings 50 are aligned with the spindle assembly 14. A workpiece to be gripped by the chuck 10, such as the pipe indicated at 60 in Fig. 5 when the chuck 10 is used with a pipe threading machine, is extended axially through the chuck 10 and supported on the jaws 34 at the lower sides of the openings 50. The drive mechanism for the spindle assembly 14 is then operated to rotate the spindle assembly which in turn rotates the cover plates 20 and 24 and the guide plates 28. A brake 62, illustrated as being of the type which extends about the actuating rings 54 but which it is to be understood can be of any suitable type for applying a braking force to either the actuating rings 54 or the annular supporting plates 64 for the plates 54, is operated to exert a braking force on the rings 54 and the plates 64.

This application of a braking force to the actuating rings 54 provides for relative rotation of the jaw members 34 and the actuating rings 54 so that the inner surface 52 of each actuating ring 54 exerts a pressure on the jaw end surface 38 acting to move the jaw longitudinally of its guide slot 32 to move the portion 67 of the jaw 34 at one side of the opening 50 toward the axis of the spindle assembly 14. The portions 67 of all of the jaws 34 thus converge toward the axis of the spindle assembly 14 for clamping engagement with opposite sides of the pipe 60 to thus clamp the pipe 60 in the chuck 10. To facilitate clamping, the portions of the jaws 34 which engage the pipe 60 may be serrated. As long as the torque applied to the spindle 14 exceeds the cutting or other torque exerted on the pipe 60, the pipe will not slip in the jaws 34. The spring-urged extension member 42 for each jaw 34 insures a continual engagement of one end of each jaw 34 with the actuating ring 54 in all positions of a jaw member 34 and insures opening of the jaws on reverse rotation of the spindle because the springs 46 urge the jaws in a direction out of engagement with the workpiece 60. The extension 42 is necessitated by virtue of the fact that since the ring member opening 56 is eccentric with respect to the axis about which the jaw 34 is rotated, the distance across the opening 56, as measured through the spindle axis, is variable.

Once the pipe has been clamped in the chuck, the braking force applied to the rings 54 by the brake assembly 62 can be released because the wedge angle A between each jaw end surface 38 and the corresponding cam ring member 54 is less than the self-locking angle for these parts. Consequently, a jaw 34 will not slip relative to its cam ring 54 until a force tending to move the jaw and cam ring in a direction to release the clamped workpiece is applied to either the jaw or the cam rings. The opening 56 in each ring 54 is of a diameter such that the angle A, which varies for different positions of the jaw members 34, never exceeds the self-locking angle.

It is to be understood that the opening 56 in each cam ring may be of a shape such that the inner surface of the ring is of a non-circular, for example a spiral, configuration. For some configurations the angle A is constant for all jaw positions and the opening can be designed so that the angle is the maximum permissible in each case.

The jaw end surfaces 38 are shaped to insure that the angle A will not exceed the locking angle and to reduce to a minimum the relative rotation of the jaws 34 and the rings 54 necessary to accomplish clamping.

When the pipe 60 is to be released from the chuck 10, the spindle 14 is stopped and then rotated in a reverse direction and the brake 62 is again applied. Consequently, the jaw members 34 are rotated in reverse directions from their positions shown in Fig. 5 to their positions shown in Fig. 2. To prevent the jaw members 34 from moving past their open positions shown in Fig. 2 to closed positions in an opposite direction from the direction in which they were initially moved to close the jaws, a stop lever 70 is pivotally supported on a pin 72 carried by one of the support plates 64 and has a working end 74 which is engageable with a stop pin 76 secured to the outer cover plate 24 by a cap screw 78. A spring member 80 carried by the lever 70 engages the support plate 64 for normally urging the lever 70 toward a position in which it will clear the stop pin 76 when the brake is released.

It is to be understood that the workpiece in the chuck 10 has been illustrated as the pipe 60 only for purposes of illustration since it is apparent that the chuck 10 can be used to grip a workpiece of substantially any cross-sectional shape.

It will be understood that the specific construction of the improved chuck which is herein disclosed and described is presented for purposes of explanation and illustration and is not intended to indicate limits of the invention, the scope of which is defined by the following claims.

What is claimed is:

1. In a chuck having a rotatable spindle, a jaw assembly mounted on said spindle, said assembly comprising a plurality of jaw members having openings of substantially the same size extended therethrough at positions intermediate the ends thereof, said jaw members being arranged in a side by side relation so that said openings are aligned with the axis of said spindle in the open positions of said jaw members, and means including rotatable members extending about said jaw members for moving said jaw members to closed positions in which the axes of said openings are offset substantially equal distances on different sides of said spindle axis, said distance being less than the radius of said openings.

2. In a chuck having a pair of spaced axially aligned cover plates mounted for rotation about the axis thereof, a jaw assembly disposed between said cover plates and comprising a plurality of stacked guide plates arranged between and supported on said cover plates, each of said guide plates having slot means extending diametrically thereof so as to form a guideway, a jaw member mounted in each of said guideways, each jaw member being of a length to extend beyond the ends of the guideway therefor and having an opening intermediate the ends thereof, actuating rings rotatably mounted on said cover plates and corresponding to said jaw members, each of said actuating rings having an opening extending therethrough of a transverse dimension greater than the length of the corresponding jaw member, each of said actuating plate openings being eccentric with respect to the opening in the corresponding jaw member and being arranged so that it extends about said jaw member, said jaw members being angularly arranged with respect to each other and having the openings therein axially aligned with said cover plate axis in one position of said jaw members, brake means engageable with said actuating rings for restraining rotation thereof with said cover plates and thereby providing for rotation of said jaw members relative to said actuating rings so that each jaw member is shifted in a direction lengthwise thereof so that one side of each jaw member opening is moved toward said cover plate axis for clamping engagement with one side of a workpiece disposed on said axis.

3. In a chuck, a ring member having an eccentric opening extending therethrough, a longitudinally extending jaw member arranged within said opening so that it extends across the opening and has one of its ends engaging said ring member, said jaw member having ends and an opening extended therethrough intermediate said ends, said jaw member opening being eccentric with respect to said ring opening whereby when said jaw member is rotated about a fixed axis from a first position in which the axis of said jaw opening coincides with said fixed axis to a second position angularly spaced from said first position, said jaw opening is shifted with respect to said fixed axis.

4. In a chuck, a plurality of superposed ring members having eccentric openings extending therethrough, a plurality of longitudinally extending jaw members corresponding to and arranged within said openings so that they extend across and engage opposite sides of the openings, each of said jaw members having ends and an opening extending therethrough intermediate said ends, each jaw member opening being eccentric with respect to the corresponding ring opening whereby when said jaw member is rotated about a fixed axis from a first position in which the axis of said jaw opening coincides with said fixed axis to a second position, said jaw opening is shifted with respect to said fixed axis, said jaw member openings being disposed so that on movement from said first to said second positions, one side of each opening moves toward said fixed axis in a direction toward the corresponding side of the other opening.

5. In a chuck having a rotatable spindle, a jaw assembly mounted on said spindle, said assembly comprising a plurality of jaw members having openings of substantially the same size extended therethrough at positions intermediate the ends thereof, said jaw members being arranged in a side by side relation so that said openings are aligned with the axis of said spindle in the open positions of said jaw members, cam rings encircling said jaw members for moving the jaw members to closed workpiece engaging positions in which the axes of said openings are offset substantially equal distances on different sides of said spindle axis, said distance being less than the radius of said openings, said cam rings having the inner surfaces thereof shaped so that the wedging angle between each cam ring and the jaw moved thereby is not greater than a self locking angle so that once a jaw is engaged with a workpiece it will not slip relative to the cam ring in engagement with the jaw.

6. In a chuck having a rotatable spindle, a jaw assembly mounted on said spindle, said assembly comprising a plurality of jaw members having openings of substantially the same size extended therethrough at positions intermediate the ends thereof, said jaw members being arranged in a side by side relation so that said openings are aligned with the axis of said spindle in the open positions of said jaw members, cam rings encircling and corresponding to said jaw members for moving the jaw members to closed workpiece engaging positions in which the axes of said openings are offset substantially equal distances on different sides of said spindle axis, said distance being less than the radius of said openings, said cam rings having the inner surfaces thereof shaped so that the wedging angle between each cam ring and the jaw moved thereby is not greater than a self locking angle so that once a jaw is engaged with a workpiece it will not slip relative to the cam ring in engagement with the jaw, and brake means engageable with said cam rings for accomplishing relative movement of said cam rings and the corresponding jaw members.

References Cited in the file of this patent
UNITED STATES PATENTS 2,600,707   Turnbaugh _____ June 17, 1952